(12) United States Patent
Gu

(10) Patent No.: US 11,505,267 B1
(45) Date of Patent: Nov. 22, 2022

(54) BICYCLE PARKING RACK

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 0 days.

(21) Appl. No.: 17/494,802

(22) Filed: Oct. 5, 2021

(51) Int. Cl.
| | |
|---|---|
| B62H 3/04 | (2006.01) |
| B62H 3/06 | (2006.01) |
| B62H 3/08 | (2006.01) |
| A47F 5/06 | (2006.01) |
| B62H 3/12 | (2006.01) |

(52) U.S. Cl.
CPC ............ *B62H 3/04* (2013.01); *A47F 5/06* (2013.01); *B62H 3/06* (2013.01); *B62H 3/08* (2013.01); *B62H 3/12* (2013.01)

(58) Field of Classification Search
CPC ... B62H 3/00; B62H 3/04; B62H 3/12; B62H 3/08; B62H 3/06; A47F 5/04; A47F 5/06; B25H 1/0007; B25H 1/0014; B25B 5/147
See application file for complete search history.

(56) References Cited

U.S. PATENT DOCUMENTS

| | | | | | |
|---|---|---|---|---|---|
| 547,412 | A | * | 10/1895 | Boerum | B62H 3/12 211/17 |
| 5,082,120 | A | * | 1/1992 | Vega | B62H 3/12 211/20 |
| 5,454,473 | A | * | 10/1995 | Hennessey | A47F 5/04 211/85.6 |
| 5,516,020 | A | * | 5/1996 | Lawler | B60R 9/00 224/570 |
| 5,544,763 | A | * | 8/1996 | McClain | B25H 1/0014 248/176.1 |
| 5,690,260 | A | * | 11/1997 | Aikins | B60R 9/10 224/532 |
| 5,833,074 | A | * | 11/1998 | Phillips | B60R 9/10 211/21 |
| 6,679,388 | B1 | * | 1/2004 | Chiu | B62H 3/12 248/170 |
| 9,610,993 | B1 | * | 4/2017 | Ho | B62H 3/06 |
| 9,650,092 | B1 | * | 5/2017 | Tsai | B62H 3/08 |
| D855,008 | S | * | 7/2019 | Man | D12/407 |
| 11,008,060 | B1 | * | 5/2021 | Liu | B62H 3/10 |
| 2015/0231780 | A1 | * | 8/2015 | Hirokawa | B25H 1/0014 248/670 |

* cited by examiner

*Primary Examiner* — Ko H Chan

(57) ABSTRACT

A bicycle parking rack includes a base with a first support unit and a second support unit connected thereto. The first support unit restricts one of two wheels of a bicycle that is not in upright pose. The second support unit is pivotably connected to the base and includes an outer tube pivotably connected to the base and an inner tube that is movably inserted in the outer tube. An extension rod is threadedly connected to the inner tube and movable with the inner tube relative to the outer tube, The extension rod is configured to extend through one of the two wheels of the bicycle, or to contact a seat post of the bicycle when the bicycle is in upright pose, while the first support unit supports another one of the two wheels of the bicycle.

7 Claims, 12 Drawing Sheets

BICYCLE PARKING RACK

BACKGROUND OF THE INVENTION

1. Fields of the Invention

The present invention relates to a bicycle parking rack, and more particularly, to a bicycle parking rack that secures the bicycle in horizontal position or upright position to save space required.

2. Descriptions of Related Art

The existed bicycle parking racks known to applicant are disclosed in Taiwanese Patent I369309 and Taiwanese Utility Model M533604. The above-mentioned bicycle parking racks are all set horizontally, that is, one of the two wheels is restricted and clamped so as to secure the bicycle stably. Nevertheless, for some bicycle dealers who do not have a large show room with space to display a large number of bicycles. The crowded display of many bicycles may leave a bad impression to the buyers, and the bicycles may easily get scratching and damaging. For the users, an ideal bicycle parking rack makes the storage room to be minimized.

The present invention intends to provide a bicycle parking rack that eliminates shortcomings mentioned above.

SUMMARY OF THE INVENTION

The present invention relates to a bicycle parking rack that is able to secure a bicycle horizontally or, secure a bicycle in upright pose, so as to save storage space.

The present invention relates to a bicycle parking rack and comprises a base with a first support unit pivotably connected to the base so as to restrict one of two wheels of a bicycle that is not in upright pose. A second support unit is pivotably connected to the base with a distance formed between the first and second support units. The second support unit includes an outer tube and an inner tube, wherein the outer tube has a first end thereof pivotably connected to the base, and a first end of the inner tube is movably inserted into a second end of the outer tube. A second end of the inner tube is connected to an extension rod which is movable with the inner tube. The extension rod is configured to extend through one of the two wheels of the bicycle, or to contact a seat, post of the bicycle when the bicycle is in upright pose. The first support unit supports another one of the two wheels of the bicycle.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
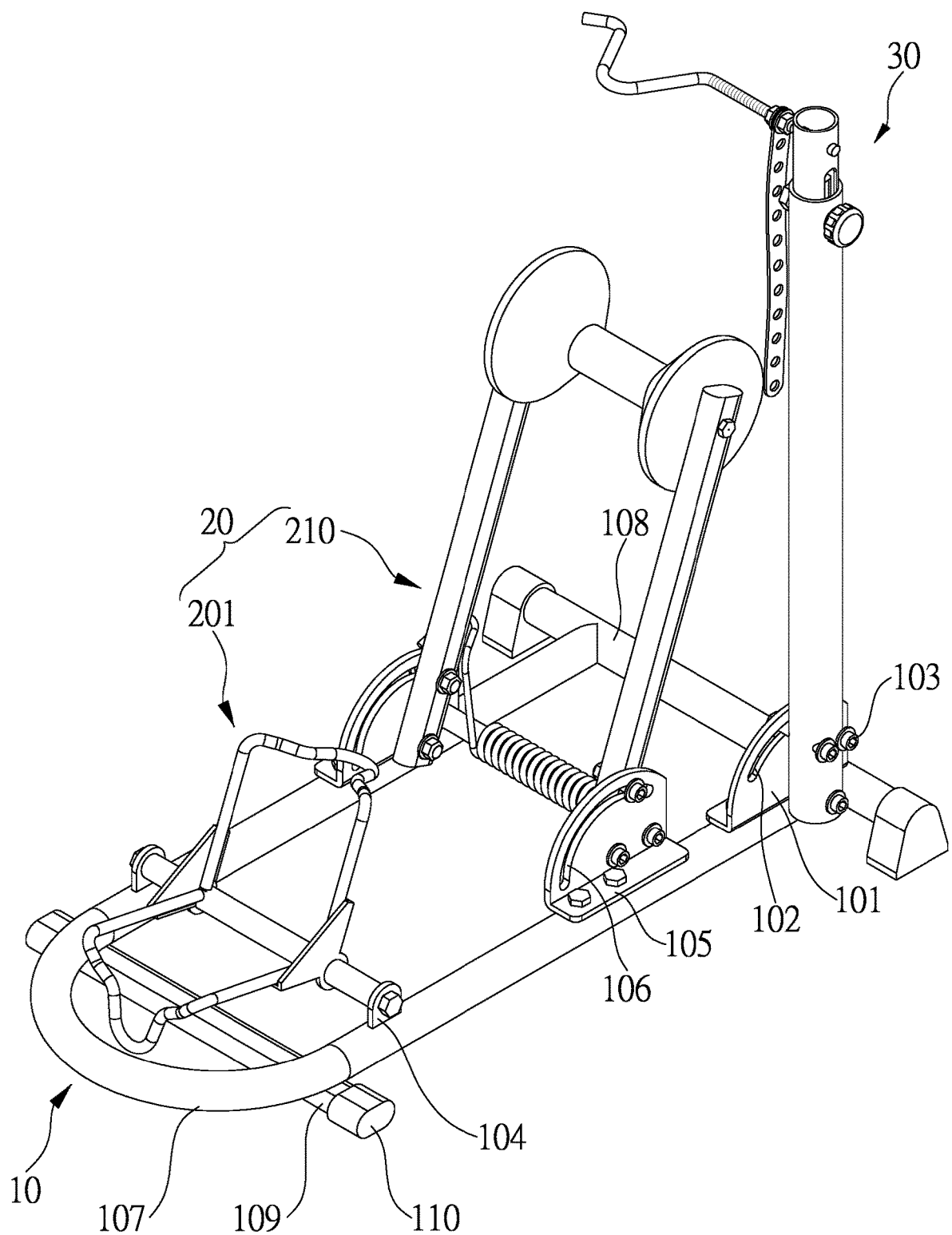
FIG. 1 is a perspective view to show the bicycle parking rack of the present invention.

Referring to FIGS. 1 to 12, the bicycle parking rack of the present invention comprises a base 10, a first support unit 20 and a second support unit 30. The first support it 20 is pivotably connected to the base 10 so as to restrict one of two wheels of a bicycle 100 that is not in upright pose. The second support unit 30 is pivotably connected to the base 10 and located at a distance from the first support unit 20. The second support unit 30 includes an outer tube 301 and an inner tube 302. The outer tube 301 has a first end thereof pivotably connected to the base 10. A first end of the inner tube 302 is movably inserted into a second end of the outer tube 301, and a second end of the inner tube 302 is connected to an extension rod 303 which is movable with the inner tube 302 relative to the outer tube 301. The extension rod 303 is configured to extend through one of the two wheels of the bicycle 100, or to contact the seat post of the bicycle 100 when the bicycle 100 is in upright pose which means only one wheel is in contact with the ground. The first support unit :20 supports another one of the two wheels of the bicycle 100. The users may secure the bicycle 100 in different poses as needed.

Figure 5:
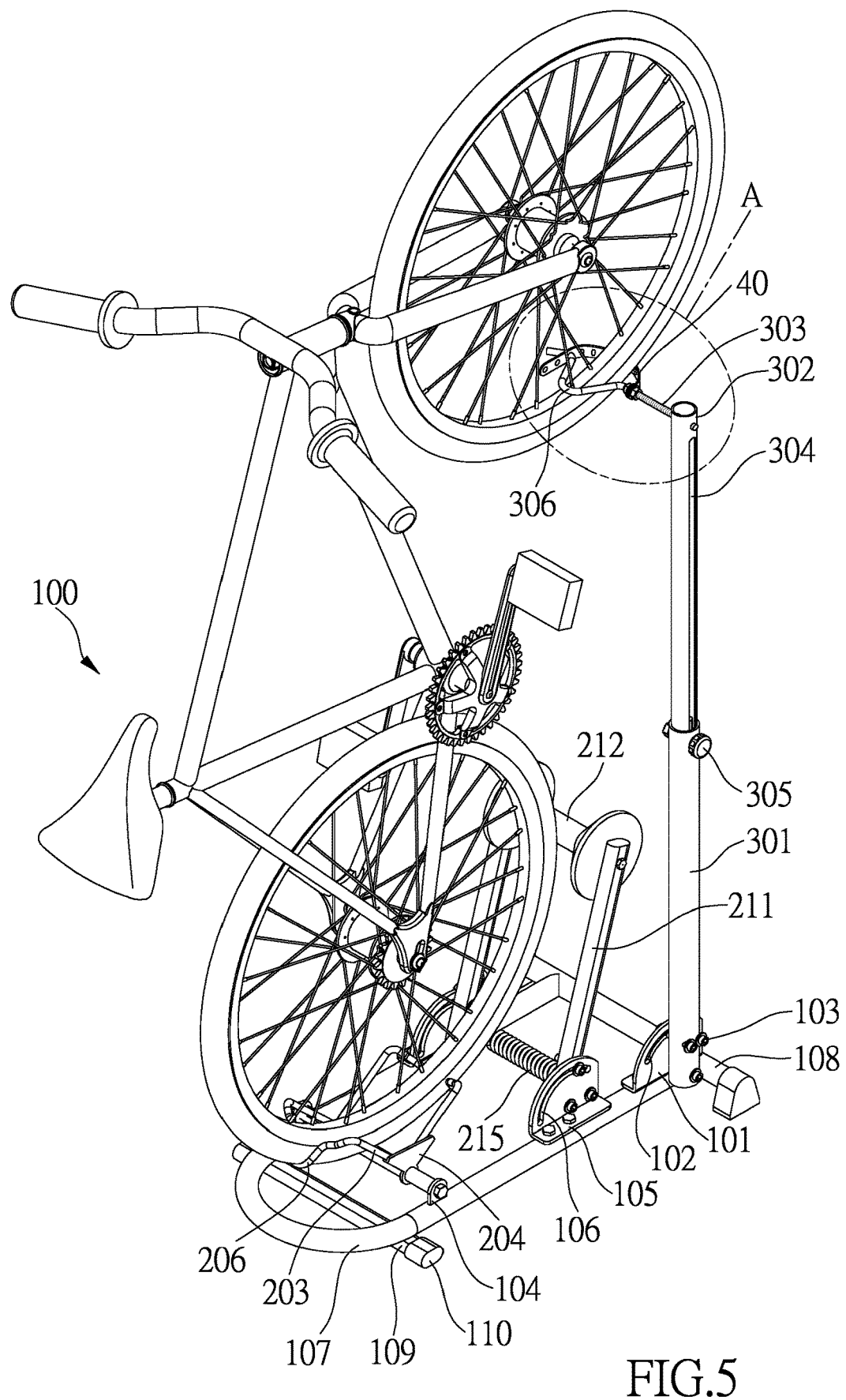
FIG. 5 shows that the bicycle is secured to the bicycle parking rack in upright pose.
Figure 10:
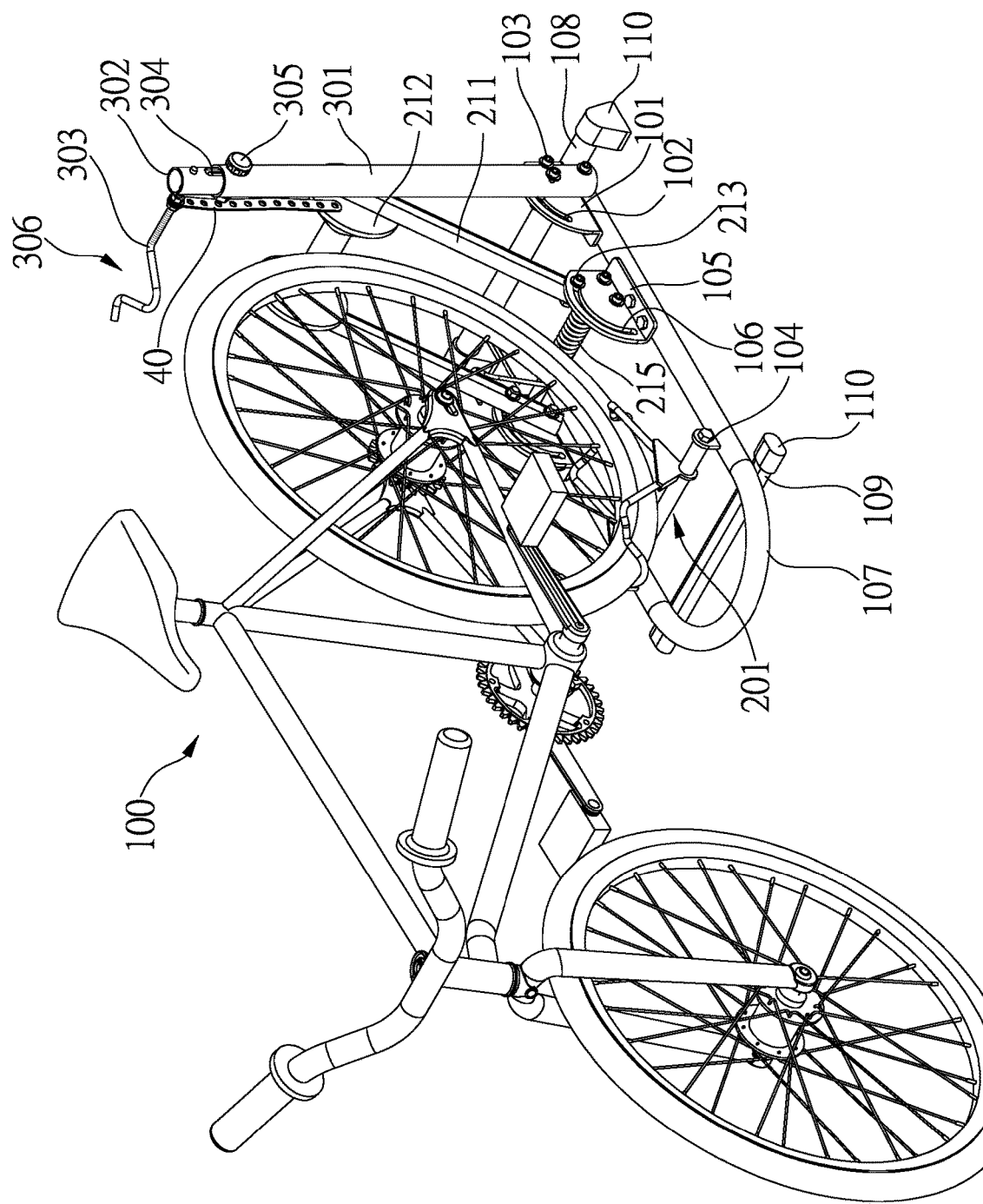
FIG. 10 shows that the bicycle is secured to the bicycle parking rack in horizontal pose.

The poses that the bicycle 100 is secured to the bicycle parking rack can be decided according to the space required for the bicycle parking rack and the bicycle 100. When the front wheel is secured on the extension rod 303, and the rear wheel is supported by the first support unit 20 for display purpose, as shown in. FIG. 5, the customers can see the whole bicycle 100 clearly and the display space can be used in better efficiency. For a larger display space, the rear wheel of the bicycle 100 is supported by the first support unit 20, as shop. FIG. 10, the customers can try to mount the bicycle 100.

Figure 2:
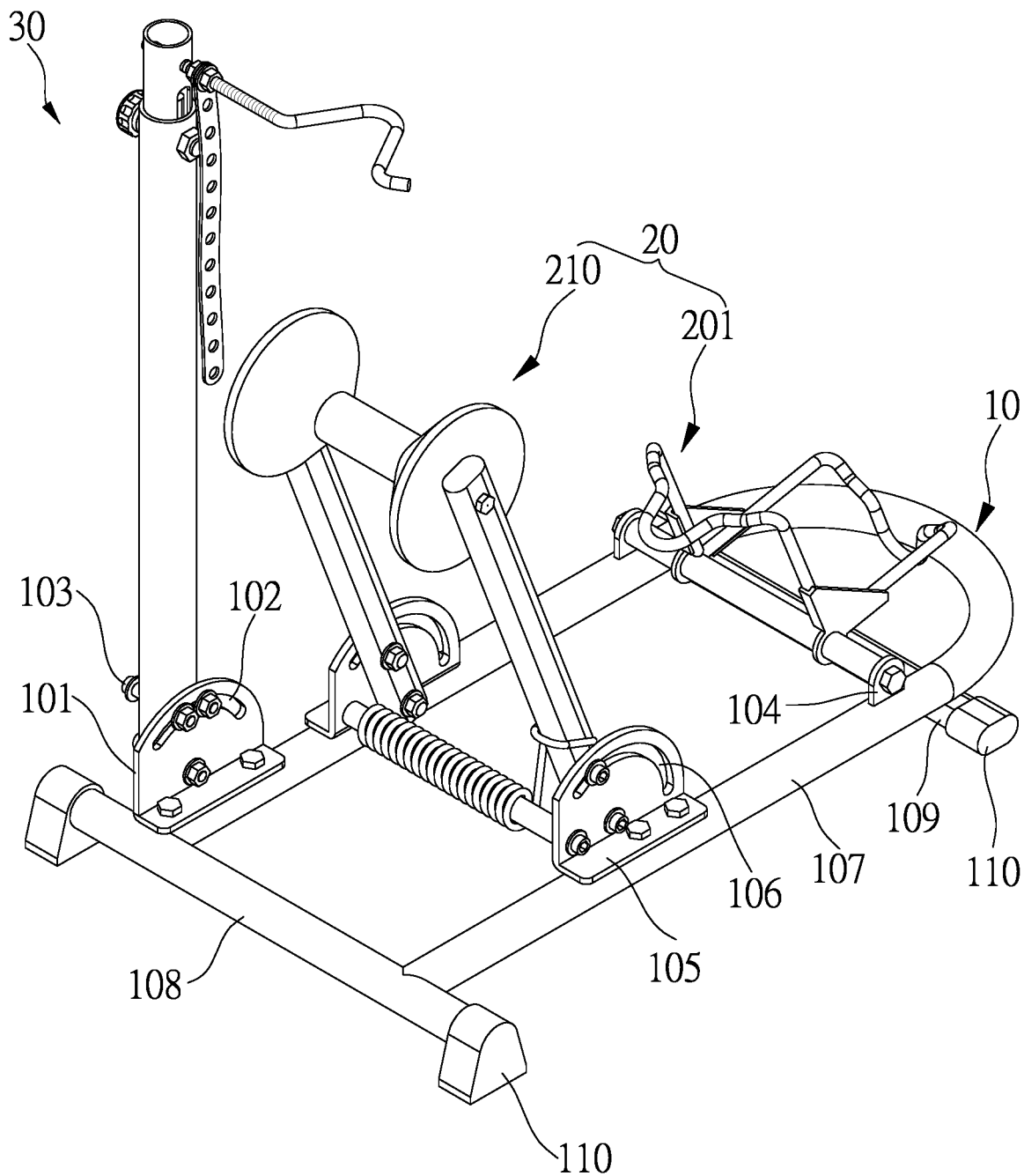
FIG. 2 is another perspective view to show the bicycle parking rack of the present invention.
Figure 9:
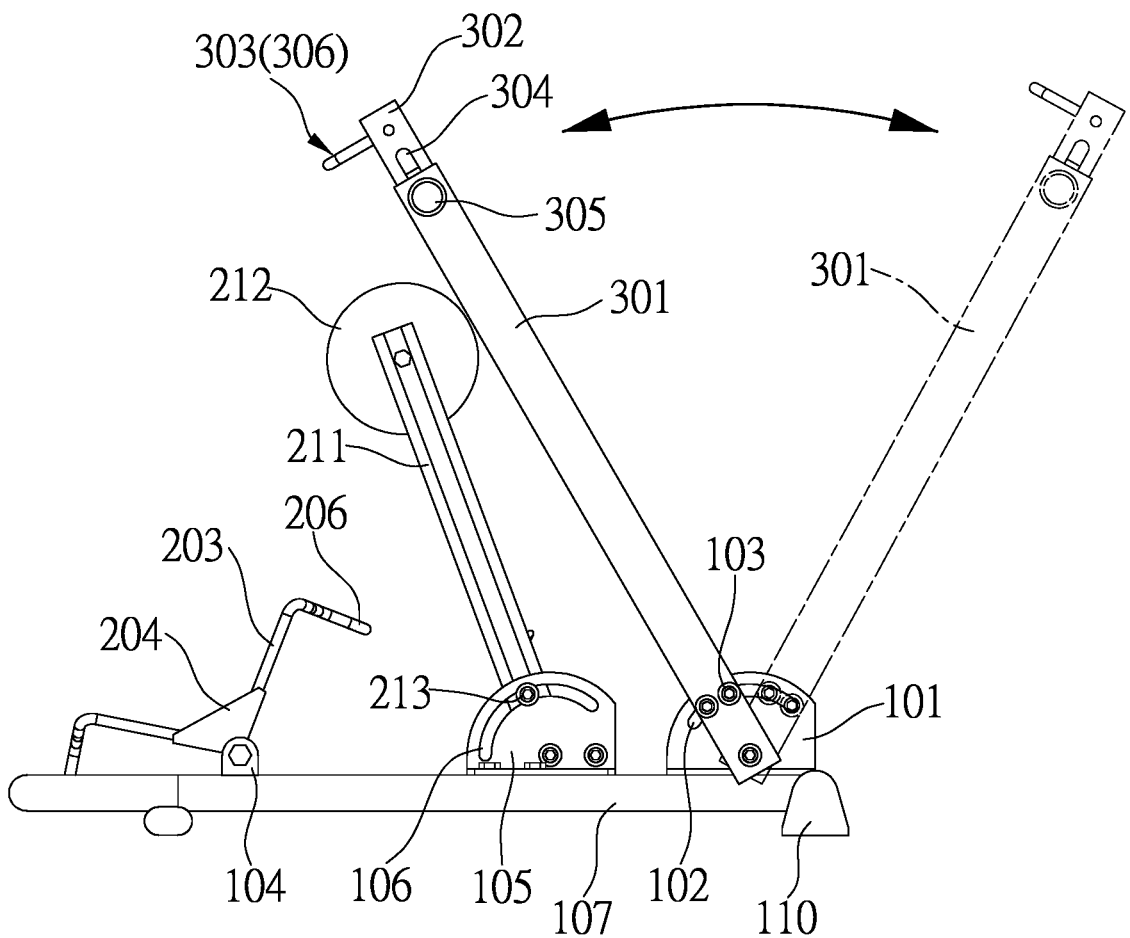
FIG. 9 illustrates that the outer tube is pivoted relative to the first lug on the base.

For the wheels of diameter diameters, the second support unit 30 can be pivoted relative to the base 10, and the inner tube 302 is adjustably movable relative to the outer tube 301. Specifically, the base 10 includes a first lug 101 which has a first curved slot 102. The outer tube 301 contacts one of two sides of the first lug 101. Two first locking members 103 extend through the first end of the outer tube 301 and the first curved slot 102. When the two first locking members 103 are not yet locked, the outer tube 301 is pivotable relative to the first lug 101. When the two first locking members 103 are locked, the outer tube 301 is secure to the first lug 101. Accordingly, the angle between the outer and inner tubes 301 302 and the base 10 can be adjusted to secure the wheels of different sizes as shown in FIGS. 1, 2 and 9.

Figure 3:
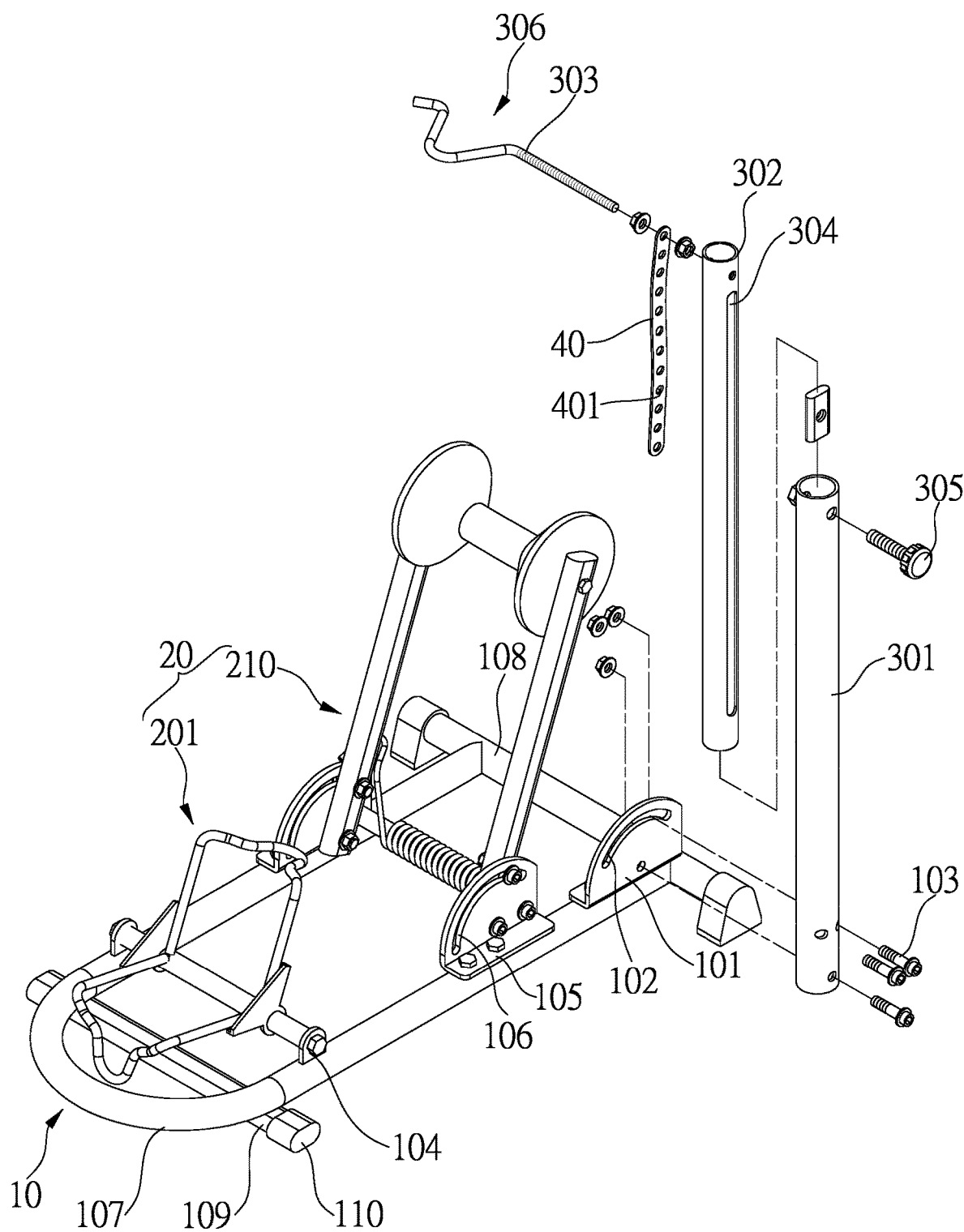
FIG. 3 is an exploded view of the bicycle parking rack of the present invention.
Figure 8:
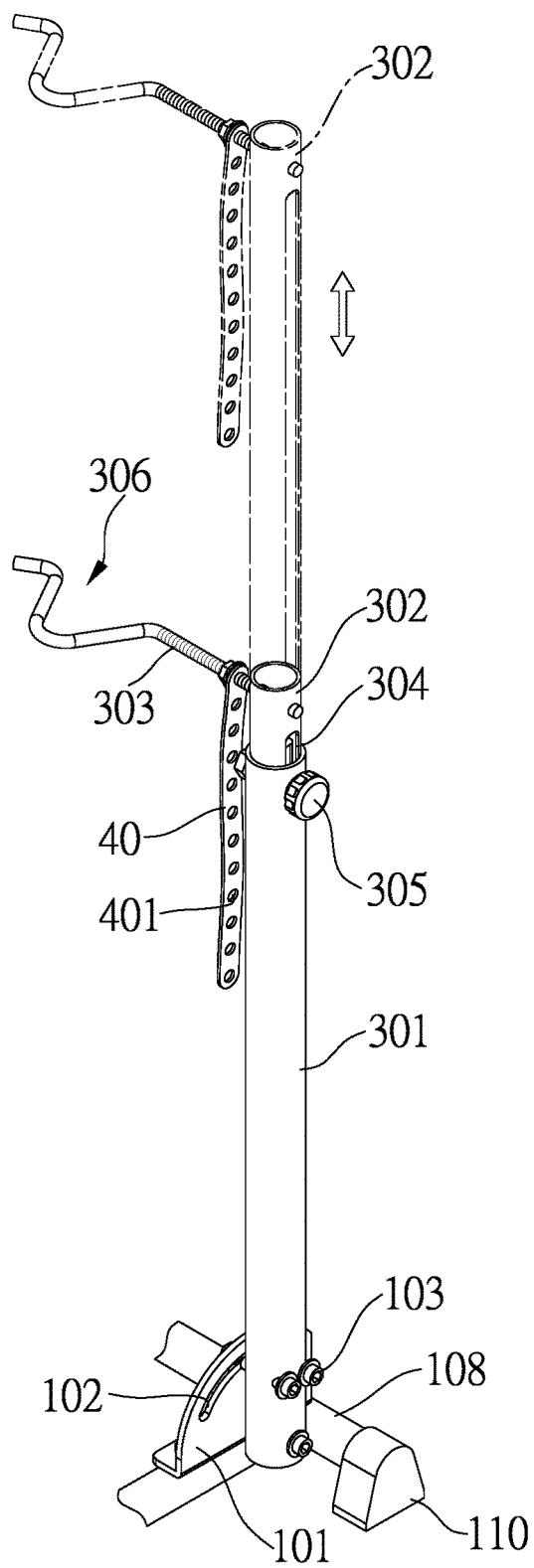
FIG. 8 illustrates the movement of the inner tube relative to the outer tube.

The inner tube 302 includes a groove 304 defined axially through. the wall thereof A second locking member 305 extends through the second end of the outer tube 301 and the groove 304, When the second locking member 305 is not yet locked, the inner tube 302 is movable relative to the outer tube 301. When the second locking member 305 is locked, the inner tube 302 is secured relative to the outer tube 301 as shown in FIGS. 3 and 8, The extension rod 303 has a first end thereof threadedly and adjustably connected to the inner tube 302, and a second end of the extension rod 303 is bent to form a first recess 306. The first recess 306 is configured to accommodate the one of the two wheels of the bicycle 100 or to contact the seat post of the bicycle 100. It is noted that the direction of the first recess 306 of the extension rod 303 is adjusted when the extension rod 303 is rotated relative to the inner tube 302.

Figure 6:
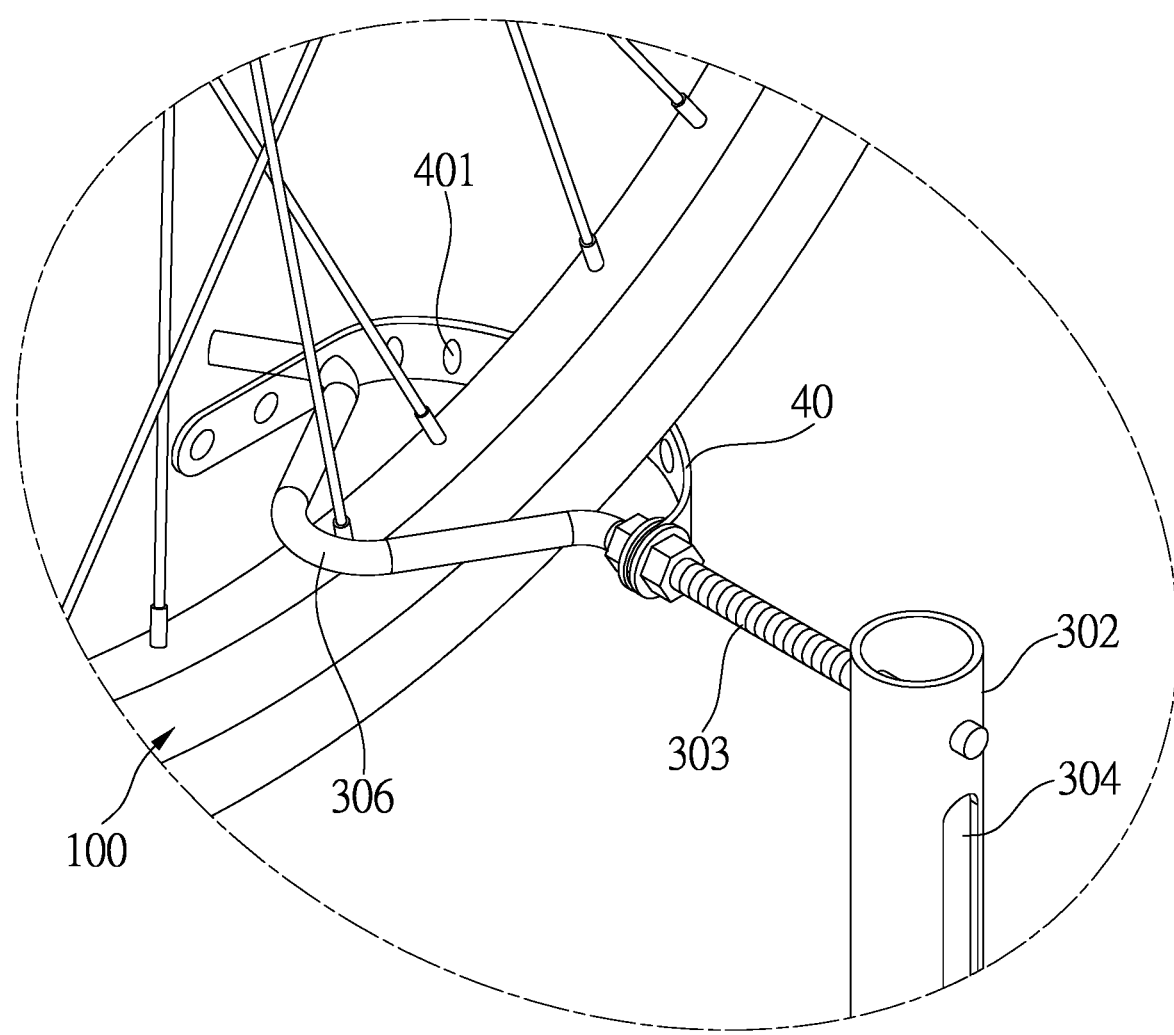
FIG. 6 is an enlarged view of the circled portion in FIG. 5.
Figure 7:
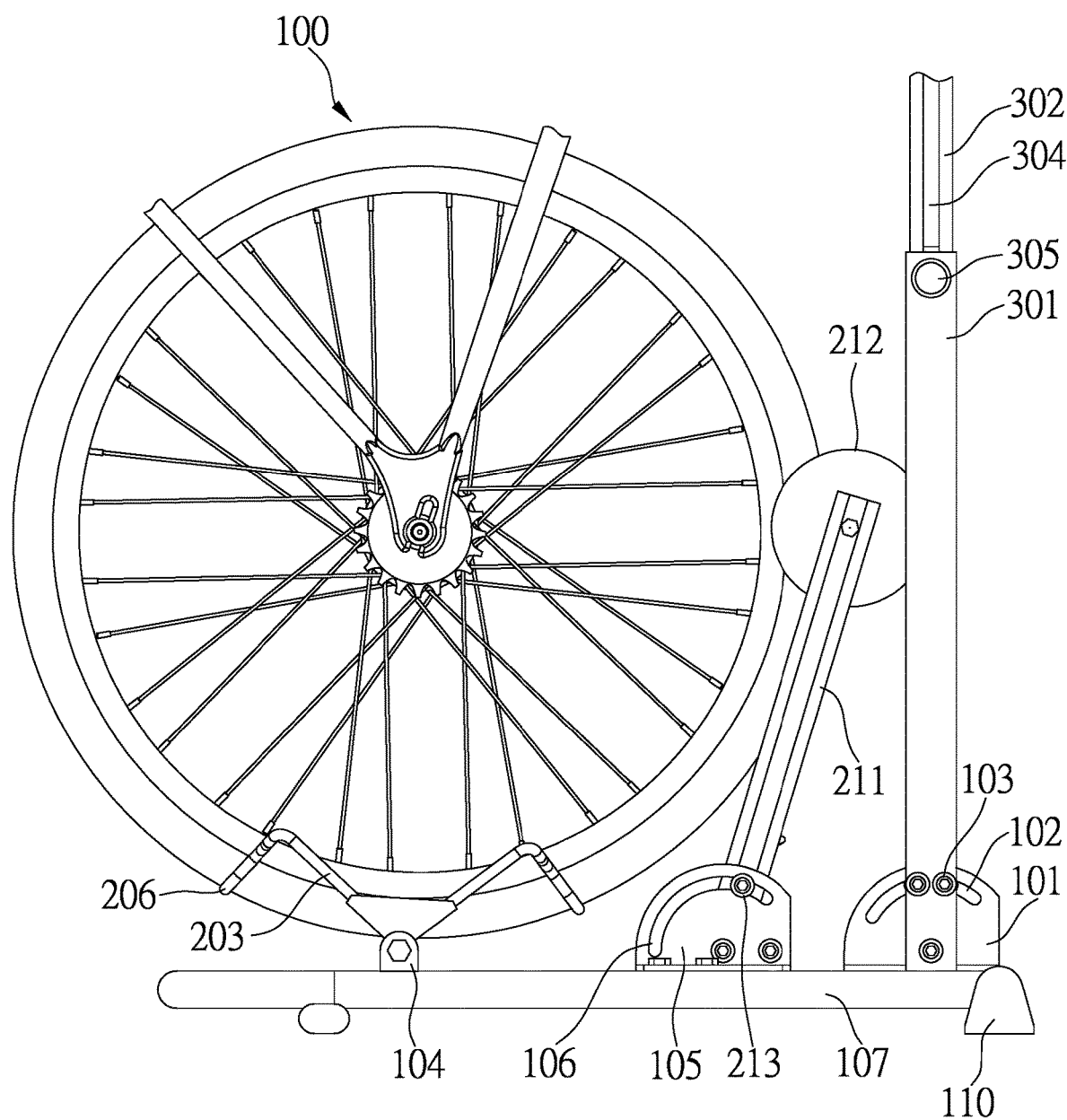
FIG. 7 is an enlarged view to show the first support unit secures one of the two wheels of the bicycle.

After the bicycle 100 is hanged on the extension rod 303, in order to provide more secure feature to the wheel, a belt 40 is connected to the first end of the extension rod 303. The belt 40 includes multiple holes 401. The belt 40 and the first recess 306 of the extension rod 303 are configured to position the one of the two wheels of the bicycle 100 or the seat post of the bicycle 100 therebetween, and the second end of the extension rod 303 extends through one of the multiple holes 401 as shown in FIGS. 3 and 6.

Figure 4:
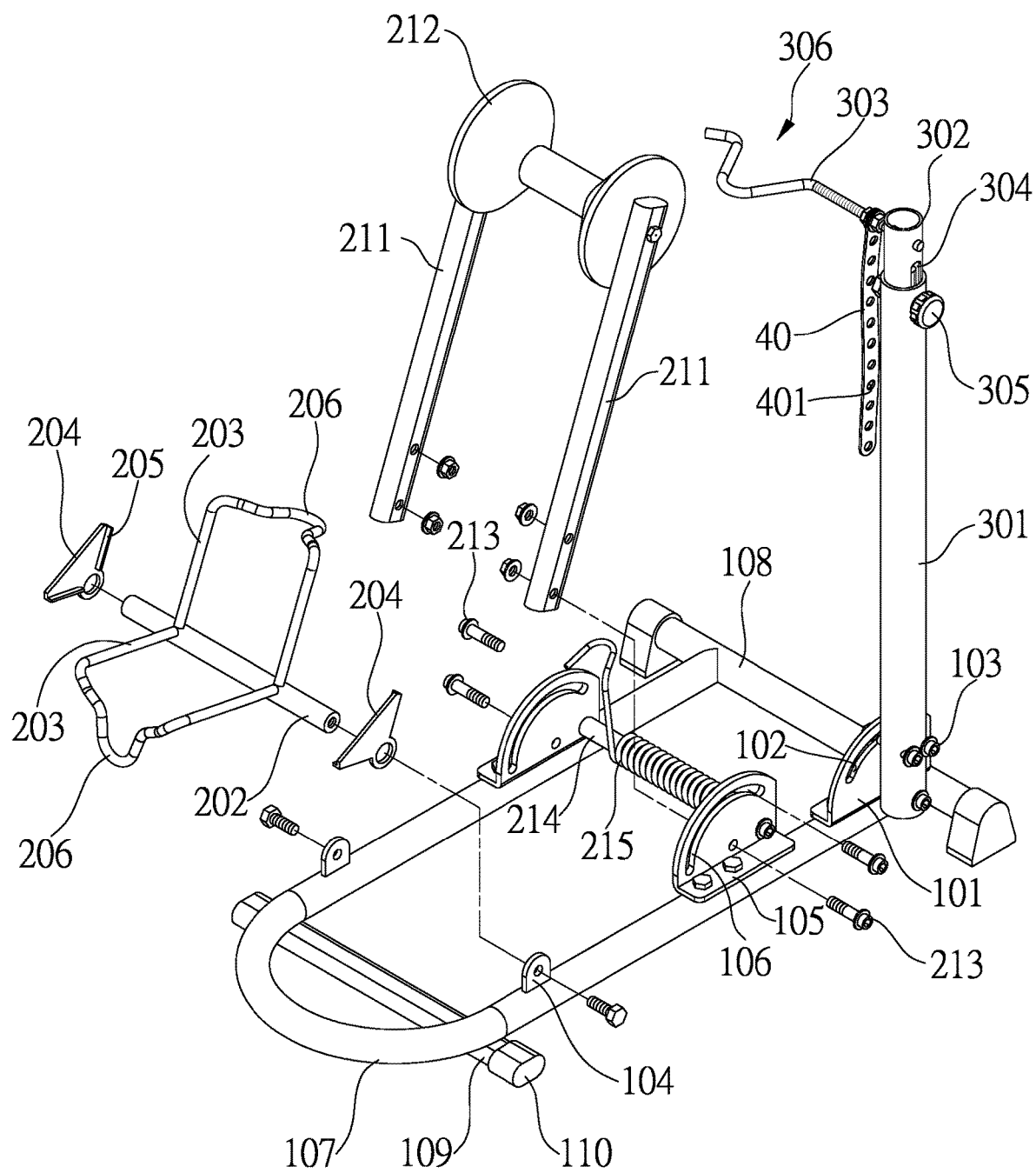
FIG. 4 is another exploded view of the bicycle parking rack of the present invention.
Figure 11:
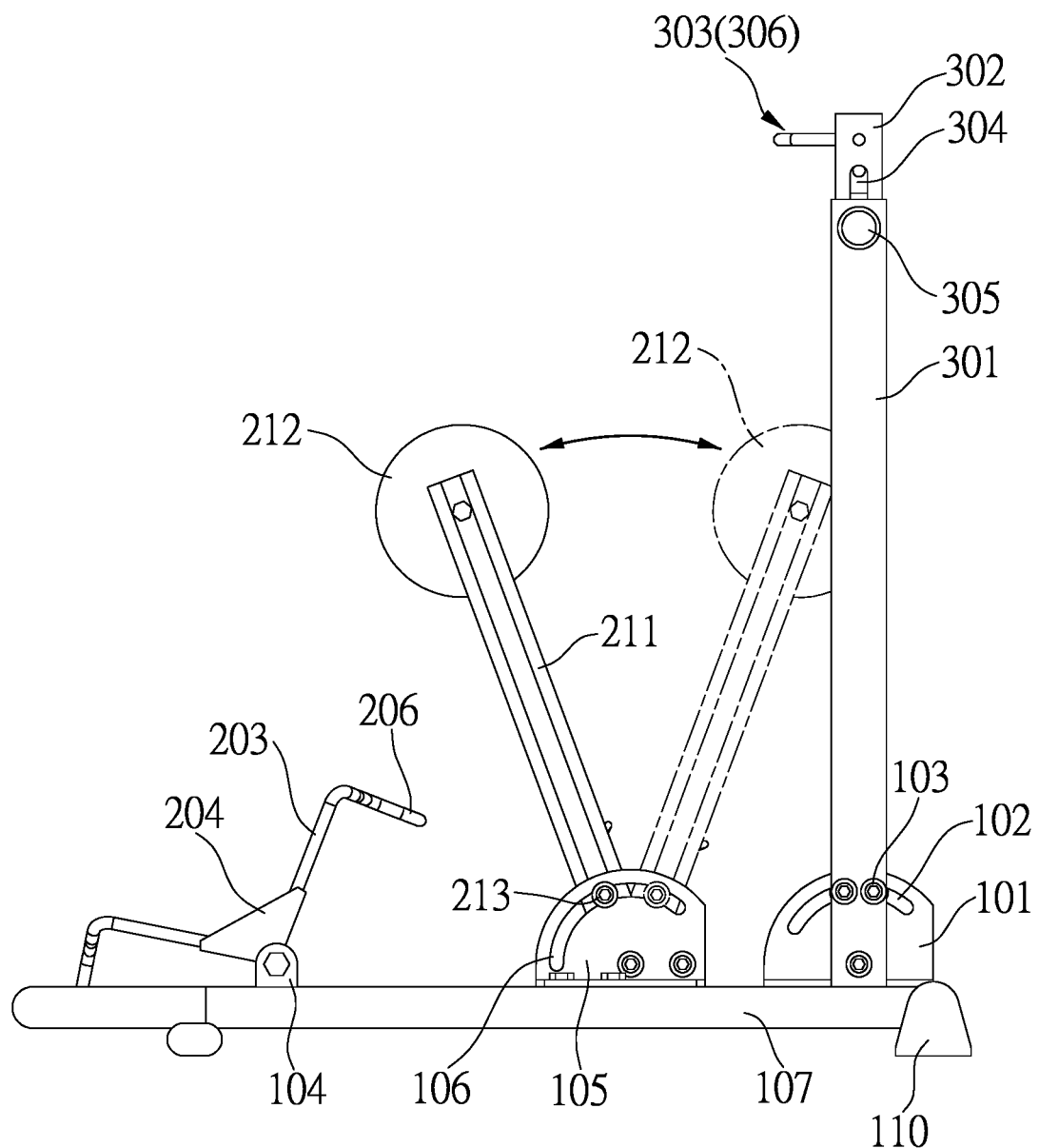
FIG. 11 shows that the posts of the first support unit is pivoted relative to the second lugs on the base.

As shown in FIGS. 4, 10 and 11, the first support unit 20 includes a front support 201 which is pivotably connected to the base 10. The front support 201 includes a shaft 202, two frames 203 and two end pieces 204. The base 10 includes two second lugs 104. The shaft 202 is pivotably connected between the two second lugs 104. The two end pieces 204 are connected to two ends of the shaft 202. Each end piece 204 includes a flange 205 extending from a thee that faces another one of the two end pieces 204. The two frames 203 each have a first end connected to the shaft 202 and contacts the two respective flanges 205 of the two end pieces 204, and a second end of each of the two frames 203 includes a second recess 206.

The first support unit 20 includes a rear support 210 which is pivotably connected to the base 10 and located close to the second support unit 30. The rear support 210 includes two posts 211 and a contact member 212. Two third lugs 105 are connected to the base 10 and each third lug 105 includes a second curved slot 106. The two posts 211 each have a first end thereof contacts and is pivotably connected to the third log 105 corresponding thereto. Multiple locking members 213 extend through the two respective second curved slots 106 and are connected to the posts 211. The contact member 212 is connected between the two posts 211. An axle 214 is connected between the two third lugs 105 and a torsion spring 215 is mounted to the axle 214, wherein one of two ends of the torsion spring 215 contacts one of the two posts 211. When the bicycle 100 is not in upright pose, the rear wheel of the bicycle 100 is simply moved toward the first support unit 20, and the rear wheel is engaged with the second recesses 206 of the two frames 203. By spinning the shaft 202 to pivot the frames 203 to move the rear wheel toward the rear support 210. The rear wheel eventually contacts the contact member 212 of the rear support 210. The torsion spring 215 is activated to store energy to urge the rear support 210 to contact the rear wheel. Therefore, the rear wheel is positioned at three points which are the second recesses 206 of the two frames 203 and the contact member 212.

Figure 12:
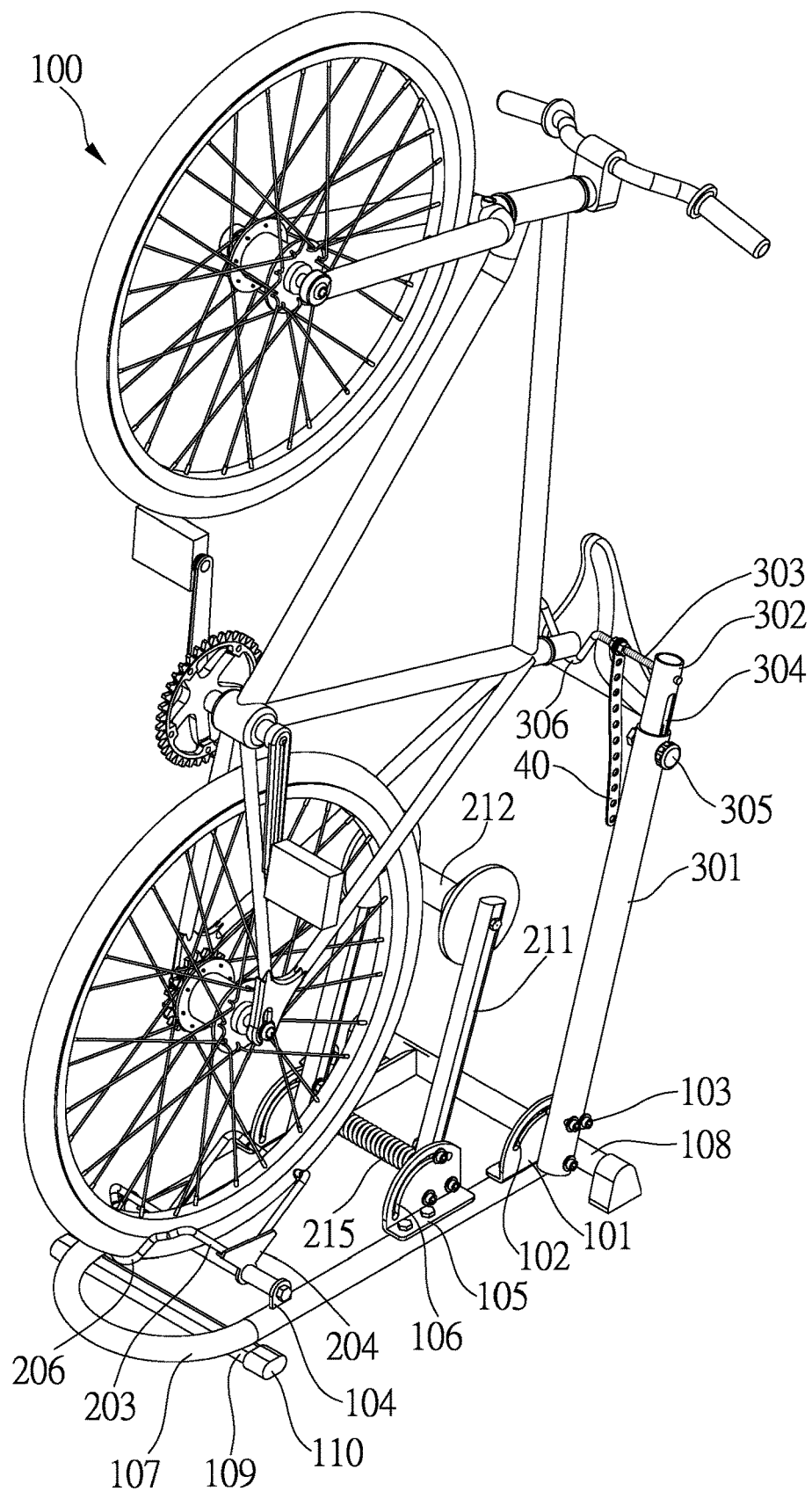
FIG. 12 shows that a bicycle is secured to the bicycle parking rack in another pose.

The base 10 is includes a U-shaped tube 107 and a main part 108 which includes a transverse bar with two parallel tubes extending from the transverse bar, and the U-shaped tube 107 is connected to the two tubular parts of the main part 108. A bottom tube 109 is connected to the underside of the U-shaped tube 107. Two ends of the transverse bar of the main pat 108 and two ends of the bottom tube 109 each have a pad 110 connected thereto to allow the base 10 to be stably put on the floor. As shown in FIG. 12, the inner tube 302 is retracted to a lower position relative to the outer tube 301, so that the seat post of the bicycle 100 can be accommodated in the first recess 306 of the extension rod 303.

While we have shown and described the embodiment in accordance with the present invention, it should be clear to those skilled in the art that further embodiments may be made without departing from the scope of the present invention.

What is claimed is:

1. A bicycle parking rack comprising:
a base;
a first, support unit pivotably connected to the base so as to restrict one of two wheels of a bicycle, and
a second support unit pivotably connected to the base, a distance being formed between the first and second support units, the second support unit including an outer tube and an inner tube, the outer tube having a first end thereof pivotably connected to the base, a first end of the inner tube movably inserted into a second end of the outer tube, a second end of the inner tube connected to an extension rod which is movable with the inner tube,
wherein the extension rod has a first end thereof rotatably connected to the inner tube, a second end of the extension rod is bent to form a first recess with an opening, the first recess is configured to accommodate another one of the two wheels of the bicycle or to contact a seat post of the bicycle, a direction of the opening of the first recess of the extension rod is adjusted when the extension rod is rotated relative to the inner tube.

2. The bicycle parking rack as claimed in claim 1, wherein the base includes a first lug which has a first curved slot, the outer tube contacts one of two sides of the first lug, two first locking members extend through the first end of the outer be and the first curved slot, when the two first locking members are not yet locked, the outer tube is pivotable relative to the first lug, when the two first locking members are locked, the outer tube is secure to the first lug.

3. The bicycle parking rack as claimed in claim 1, wherein the inner tube includes a groove defined axially through a wall thereof, a second locking member extends through the second end of the outer tube and the groove, when the second locking member is not yet locked, the inner tube is movable relative to the outer tube, when the second locking member is locked, the inner tube is secured relative to the outer tube.

4. The bicycle parking rack as claimed in claim 1, wherein a belt is connected to the first end of the extension rod and includes multiple holes, the belt and the first recess of the extension rod are configured to position the one of the two wheels of the bicycle or the seat post of the bicycle therebetween, the second end of the extension rod extends through one of the multiple holes.

5. The bicycle parking rack as claimed in claim 1, wherein the first support unit includes a front support which is pivotably connected to the base, the front support includes a shaft, two frames and two end pieces, the base includes two second lugs, the shaft is pivotably connected between the two second lugs, the two end pieces are connected to two ends of the shaft, each end piece includes a flange extending from a face that faces another one of the two end pieces, the two frames each have a first end connected to the shaft and contacts the two respective flanges of the two end pieces, a second end of each of the two frames includes a second recess.

6. The bicycle parking rack as claimed in claim 5, wherein in the first support it includes a rear support which is pivotably connected to the base and located close to the second support unit, the rear support includes two posts and a contact member, two third lugs are connected to the base and each third lug includes a second curved slot, the two posts each have a first end thereof contacts and is pivotably connected to the third lug corresponding thereto, multiple locking members extend through the two respective second curved slots and are connected to the posts, the contact member is connected between the two posts, an axle is connected between the two third lugs and a torsion spring is mounted to the axle, one of two ends of the torsion spring contacts one of the two posts.

7. The bicycle parking rack as claimed in claim 1, wherein the base includes a U-shaped tube and a main part, the U-shaped tube is connected to two tubular parts of the main part, a bottom tube is connected to an underside of the U-shaped tube, two ends of the main part and two ends of the bottom tube each have a pad connected thereto.

\* \* \* \* \*